United States Patent
Okano et al.

(10) Patent No.: US 10,455,104 B2
(45) Date of Patent: Oct. 22, 2019

(54) INFORMATION PROCESSING APPARATUS, IMAGE FORMING APPARATUS, AND NON-TRANSITORY COMPUTER READABLE MEDIUM WITH COMMUNICATION OF PRINTER LAYOUT INFORMATION IN RESPONSE TO IMAGE PROCESSING AND READING SPEED

(71) Applicant: FUJI XEROX CO., LTD., Tokyo (JP)

(72) Inventors: Masashi Okano, Kanagawa (JP); Kiyotaka Tsuchibuchi, Kanagawa (JP); Hiroshi Niina, Kanagawa (JP); Hiroshi Hayashi, Kanagawa (JP); Junichi Shimizu, Kanagawa (JP); Tetsuya Wakiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 30 days.

(21) Appl. No.: 15/794,294

(22) Filed: Oct. 26, 2017

(65) Prior Publication Data
US 2018/0227440 A1  Aug. 9, 2018

(30) Foreign Application Priority Data
Feb. 7, 2017  (JP) .................................. 2017-020651

(51) Int. Cl.
*H04N 1/00* (2006.01)
*G03G 15/00* (2006.01)
(Continued)

(52) U.S. Cl.
CPC ...... *H04N 1/00931* (2013.01); *G03G 15/0189* (2013.01); *G03G 15/50* (2013.01);
(Continued)

(58) Field of Classification Search
None
See application file for complete search history.

(56) References Cited

U.S. PATENT DOCUMENTS 6,621,592 B1 * 9/2003 Takayama .......... H04N 1/00954
358/1.15
6,873,427 B1 * 3/2005 Matsuda ............ H04N 1/00931
358/1.1
(Continued)

FOREIGN PATENT DOCUMENTS

JP 2001-045304 A 2/2001
JP 2009-006507 A 1/2009

*Primary Examiner* — Scott A Rogers
(74) *Attorney, Agent, or Firm* — Oliff PLC

(57) ABSTRACT

An information processing apparatus includes: a print data acquisition unit that acquires print data; a layout information acquisition unit that acquires layout information concerning plural image forming parts that are aligned from an upstream side toward a downstream side in a moving direction of a transfer target that moves and form images of respective different colors on the transfer target; and an image information generation unit that generates pieces of image information for the respective colors used by the plural image forming parts from the print data during a generation period and generates image information used by an image forming part located on an upstream side in the moving direction more in a former half of the generation period than in a latter half of the generation period.

10 Claims, 9 Drawing Sheets

(51) Int. Cl.
*H04N 1/04* (2006.01)
*G06F 3/12* (2006.01)
*G03G 15/01* (2006.01)
*G06K 15/02* (2006.01)

(52) U.S. Cl.
CPC ....... *G03G 15/5087* (2013.01); *G06F 3/1211* (2013.01); *G06F 3/1224* (2013.01); *G06F 3/1281* (2013.01); *G06F 3/1286* (2013.01); *H04N 1/00954* (2013.01); *H04N 1/0464* (2013.01); *G06K 15/1822* (2013.01); *H04N 1/0092* (2013.01); *H04N 2201/0081* (2013.01); *H04N 2201/0082* (2013.01)

(56) References Cited

U.S. PATENT DOCUMENTS

| | | | | |
|---|---|---|---|---|
| 2009/0009830 A1* | 1/2009 | Saito | .................... | H04N 1/3878 358/505 |
| 2009/0067712 A1* | 3/2009 | Oota | .................. | H04N 1/32561 382/167 |
| 2011/0038005 A1* | 2/2011 | Ochiai | ............... | G03G 15/5075 358/1.15 |
| 2011/0181901 A1* | 7/2011 | Miyake | .................. | G03G 15/50 358/1.13 |

* cited by examiner

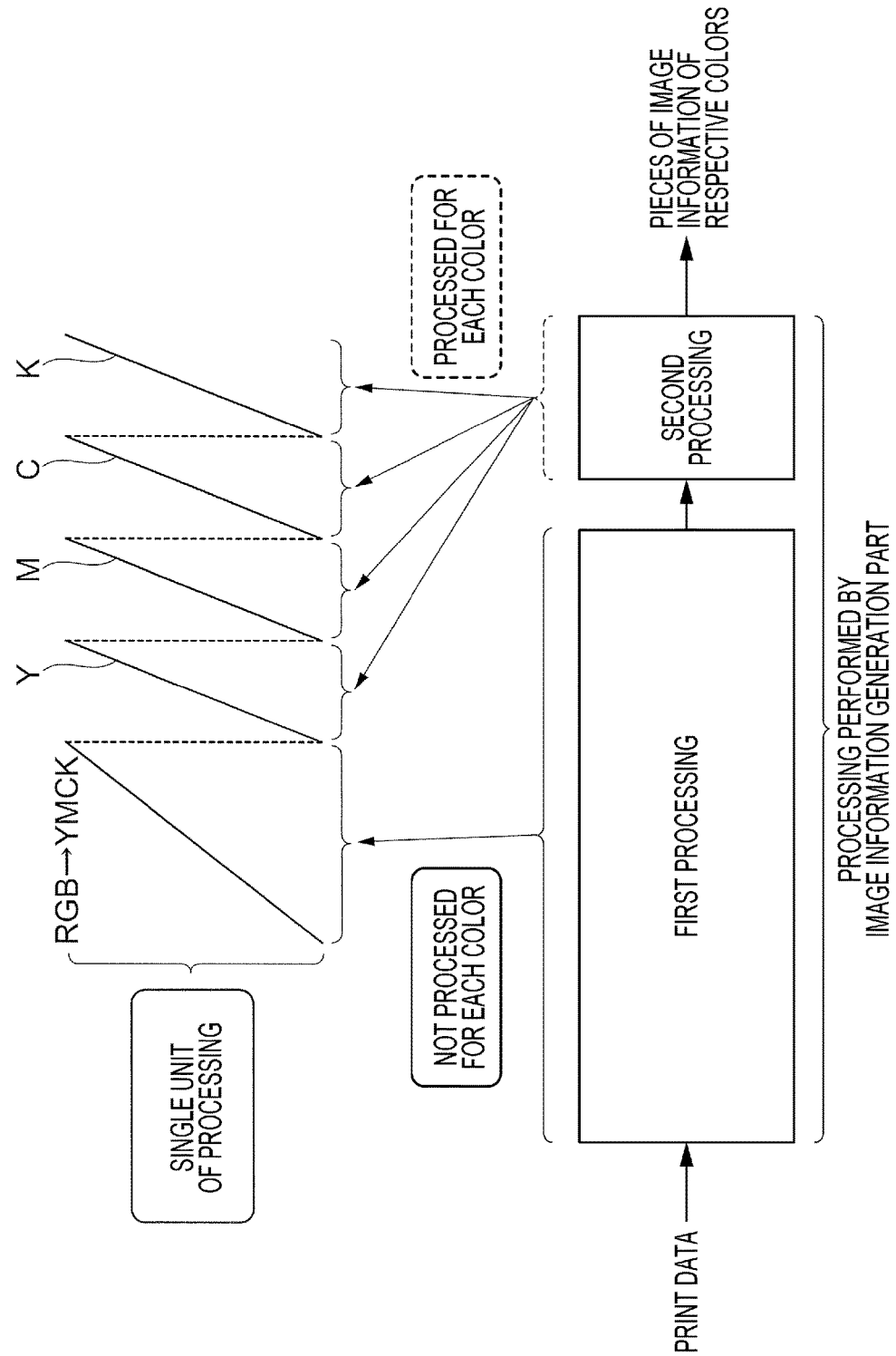

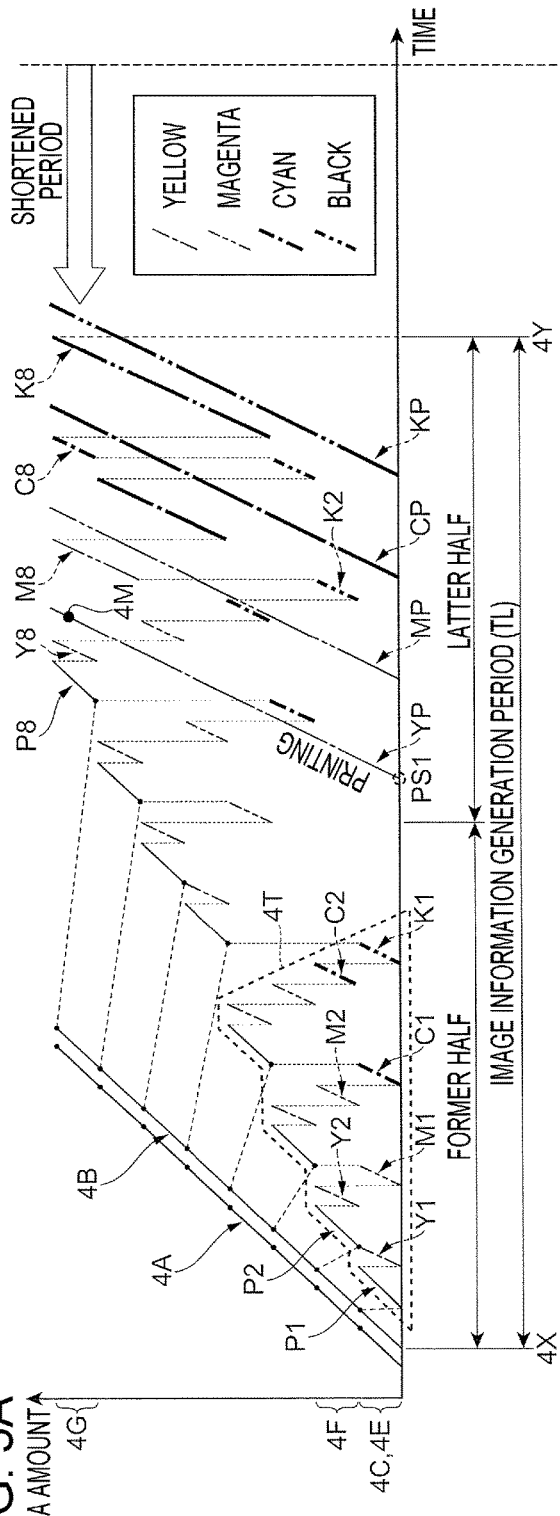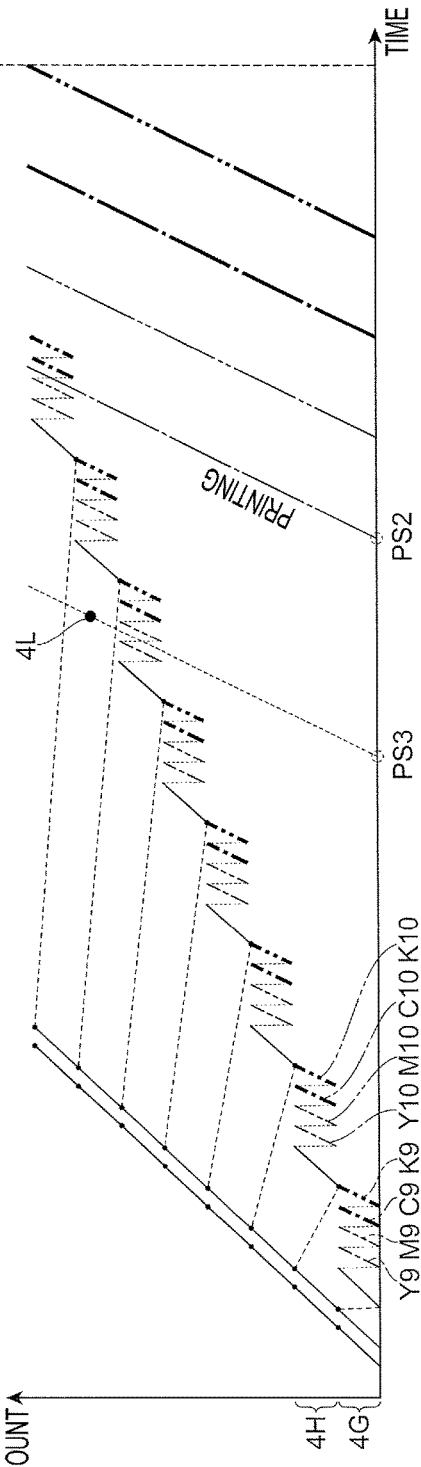

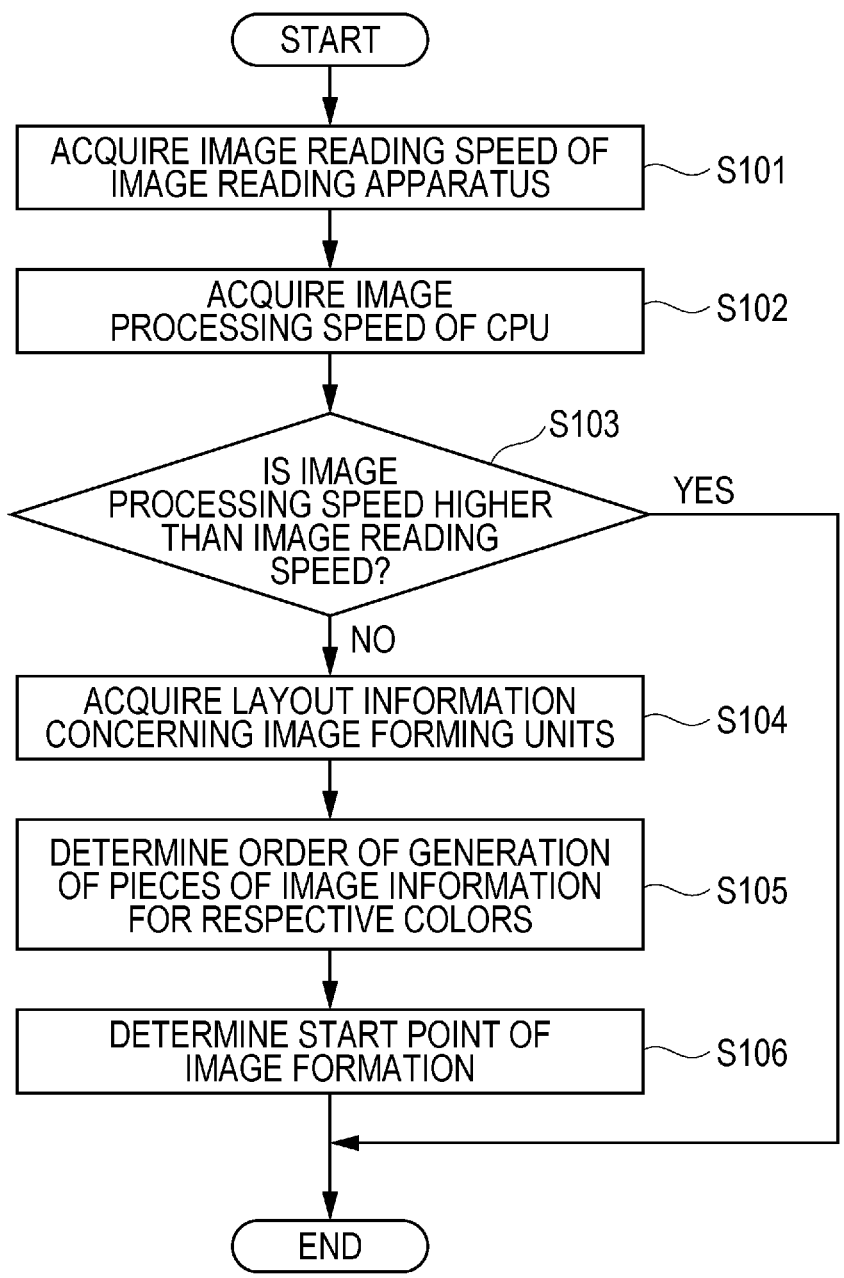

FIG. 7

| PRINTING ORDER | 1 | 2 | 3 | 4 |
|---|---|---|---|---|
| NUMBER OF UNITS OF PROCESSING (BAND HEIGHT) | 4 | 3 | 2 | 1 |

INFORMATION PROCESSING APPARATUS, IMAGE FORMING APPARATUS, AND NON-TRANSITORY COMPUTER READABLE MEDIUM WITH COMMUNICATION OF PRINTER LAYOUT INFORMATION IN RESPONSE TO IMAGE PROCESSING AND READING SPEED

CROSS-REFERENCE TO RELATED APPLICATIONS

This application is based on and claims priority under 35 USC 119 from Japanese Patent Application No. 2017-020651 filed Feb. 7, 2017.

BACKGROUND

Technical Field

The present invention relates to an information processing apparatus, an image forming apparatus, and a non-transitory computer readable medium

SUMMARY

According to an aspect of the invention, there is provided an information processing apparatus including: a print data acquisition unit that acquires print data; a layout information acquisition unit that acquires layout information concerning plural image forming parts that are aligned from an upstream side toward a downstream side in a moving direction of a transfer target that moves and form images of respective different colors on the transfer target; and an image information generation unit that generates pieces of image information for the respective colors used by the plural image forming parts from the print data during a generation period and generates image information used by an image forming part located on an upstream side in the moving direction more in a former half of the generation period than in a latter half of the generation period.

BRIEF DESCRIPTION OF THE DRAWINGS

An exemplary embodiment of the present invention will be described in detail based on the following figures, wherein:

FIG. 4 is a view for explaining a flow of processing performed by an image information generation part;

FIGS. 5A and 5B are views for explaining processing performed by the image information generation part and views for explaining processing of print data corresponding to 1 page of a document;

FIG. 6 is a flowchart illustrating a flow of a series of processes performed in the information processing apparatus;

FIG. 7 illustrates a reference table used for scheduling;

DETAILED DESCRIPTION

An exemplary embodiment of the present invention is described in detail below with reference to the attached drawings.

Figure 1:
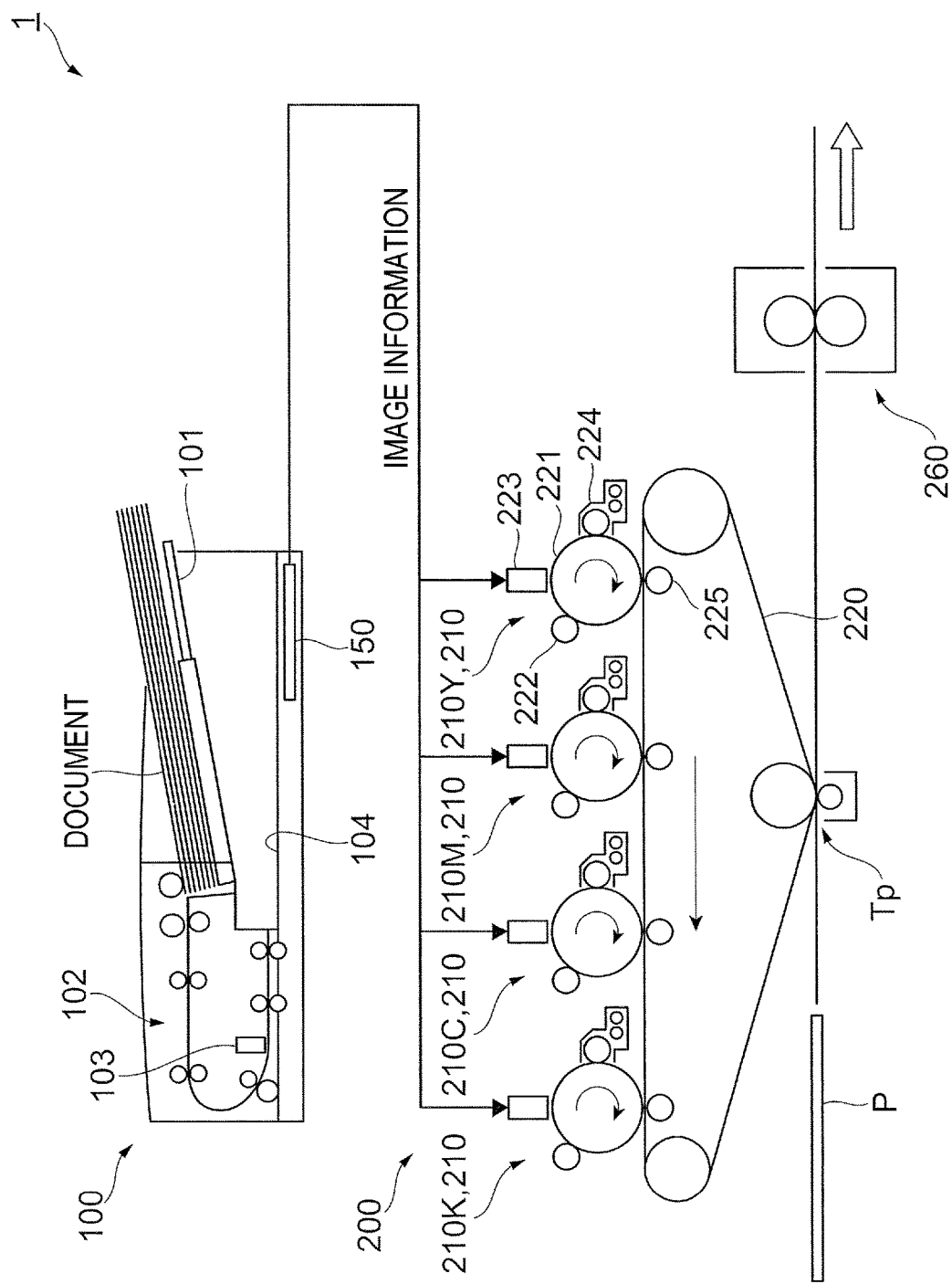
FIG. 1 illustrates a configuration of a printing system.

FIG. 1 illustrates a configuration of a printing system 1 according to the present exemplary embodiment.

The printing system 1 according to the present exemplary embodiment includes an image reading apparatus 100 and an image forming apparatus 200.

The image reading apparatus 100 reads an image on a document and thus generates print data (read data). The print data is supplied to the image forming apparatus 200, and the image forming apparatus 200 prints an image on a sheet of paper P that is an example of a recording medium.

The image reading apparatus 100 includes a document platen 101 on which a document is placed, a document transporting mechanism 102 for transporting the document toward a downstream side, and an image reading part 103 that reads an image on the transported document. The image reading part 103 is, for example, a charge coupled device (CCD). Furthermore, the image reading apparatus 100 includes a document discharge unit 104 for discharging a document from which an image has been read.

Furthermore, the image reading apparatus 100 includes an information processing apparatus 150 that processes print data obtained by reading a document.

Figure 2:
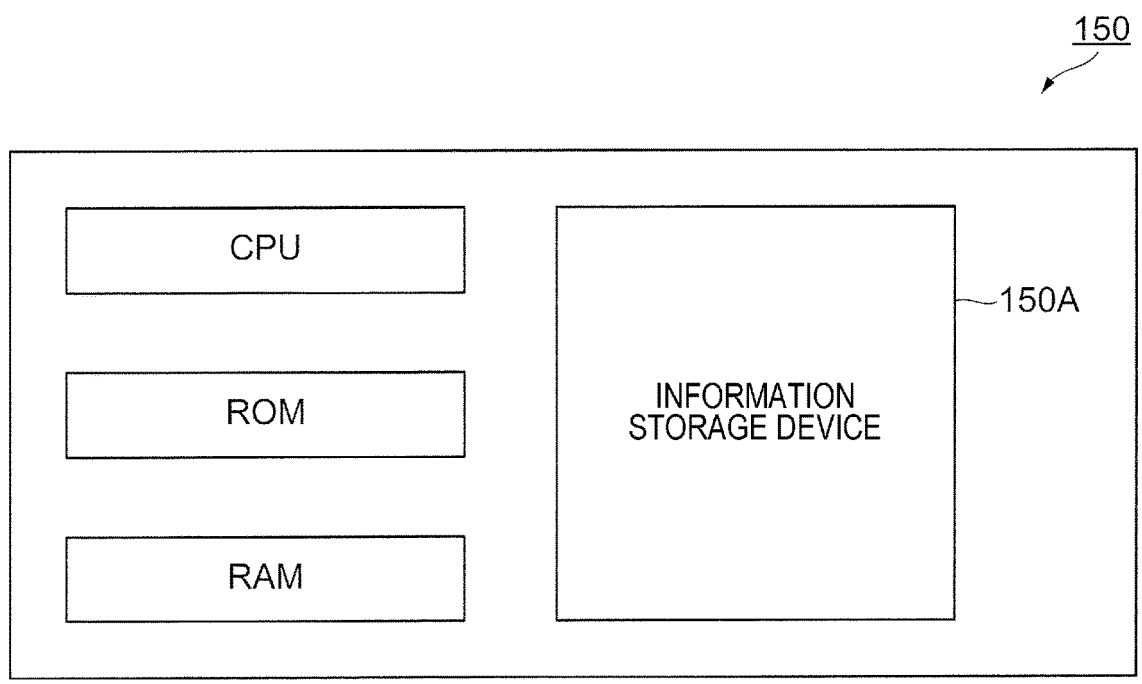
FIG. 2 illustrates a hardware configuration of an information processing apparatus.

The information processing apparatus 150 includes a central processing unit (CPU), a read only memory (ROM), and a random access memory (RAM) and includes an information storage device 150A that is, for example, a hard disk, as illustrated in FIG. 2 (a diagram illustrating a hardware configuration of the information processing apparatus 150).

As illustrated in FIG. 1, the image forming apparatus 200 includes plural image forming units 210 that are an example of image forming parts. In other words, the image forming apparatus 200 includes plural image forming units 210 that form images (toner images) of respective different colors.

More specifically, in the present exemplary embodiment, the image forming apparatus 200 includes a first image forming unit 210Y that forms a yellow toner image, a second image forming unit 210M that forms a magenta toner image, a third image forming unit 210C that forms a cyan toner image, and a fourth image forming unit 210K that forms a black toner image.

Furthermore, the image forming apparatus 200 includes an intermediate transfer belt 220 that is an example of a transfer target. The intermediate transfer belt 220 rotates (circulates) in a counterclockwise direction.

In the present exemplary embodiment, the first image forming unit 210Y, the second image forming unit 210M, the third image forming unit 210C, and the fourth image forming unit 210K form images on the intermediate transfer belt 220 that is moving. The images move to a transfer part Tp in accordance with movement of the intermediate transfer belt 220 and are transferred, at the transfer part Tp, onto a sheet of paper P transported from an upstream side.

In this way, a color image (toner image) is formed on the sheet of paper P. Then, the sheet of paper P is transported to a fixing device 260, and the fixing device 260 applies heat and pressure onto the sheet of paper P. This fixes the image on the sheet of paper P onto the sheet of paper P.

The first image forming unit 210Y, the second image forming unit 210M, the third image forming unit 210C, and the fourth image forming unit 210K are aligned from the upstream side toward the downstream side in a moving direction of the intermediate transfer belt 220.

Specifically, the first image forming unit 210Y, the second image forming unit 210M, the third image forming unit 210C, and the fourth image forming unit 210K are aligned in this order from the upstream side toward the downstream side in the moving direction of the intermediate transfer belt 220.

In FIG. 1, an example where toner images formed by the first image forming unit 210Y, the second image forming unit 210M, the third image forming unit 210C, and the fourth image forming unit 210K are transferred once onto the intermediate transfer belt 220 and are then transferred onto the sheet of paper P has been described. Alternatively, toner images formed by the first image forming unit 210Y, the second image forming unit 210M, the third image forming unit 210C, and the fourth image forming unit 210K may be directly transferred onto the sheet of paper P without being transferred once onto the intermediate transfer belt 220. In this case, the sheet of paper P is a transfer target.

Each of the first image forming unit 210Y, the second image forming unit 210M, the third image forming unit 210C, and the fourth image forming unit 210K includes a photoconductor drum 221 that is an example of a holder that holds a formed toner image and a charging device 222 that charges the photoconductor drum 221.

Furthermore, each of the first image forming unit 210Y, the second image forming unit 210M, the third image forming unit 210C, and the fourth image forming unit 210K includes an exposure device 223 that forms an electrostatic latent image on the photoconductor drum 221 by exposing the photoconductor drum 221 charged by the charging device 222 to light.

The exposure device 223 forms an electrostatic latent image on the photoconductor drum 221 by exposing the photoconductor drum 221 to light on the basis of image information that will be described later (pieces of image information generated corresponding to the first image forming unit 210Y, the second image forming unit 210M, the third image forming unit 210C, and the fourth image forming unit 210K).

Furthermore, each of the first image forming unit 210Y, the second image forming unit 210M, the third image forming unit 210C, and the fourth image forming unit 210K includes a developing device 224 and a transfer device 225.

The developing device 224 forms a toner image on the photoconductor drum 221 by developing an electrostatic latent image formed on the photoconductor drum 221. The transfer device 225 transfers the toner image formed on the photoconductor drum 221 onto the intermediate transfer belt 220.

Figure 3:
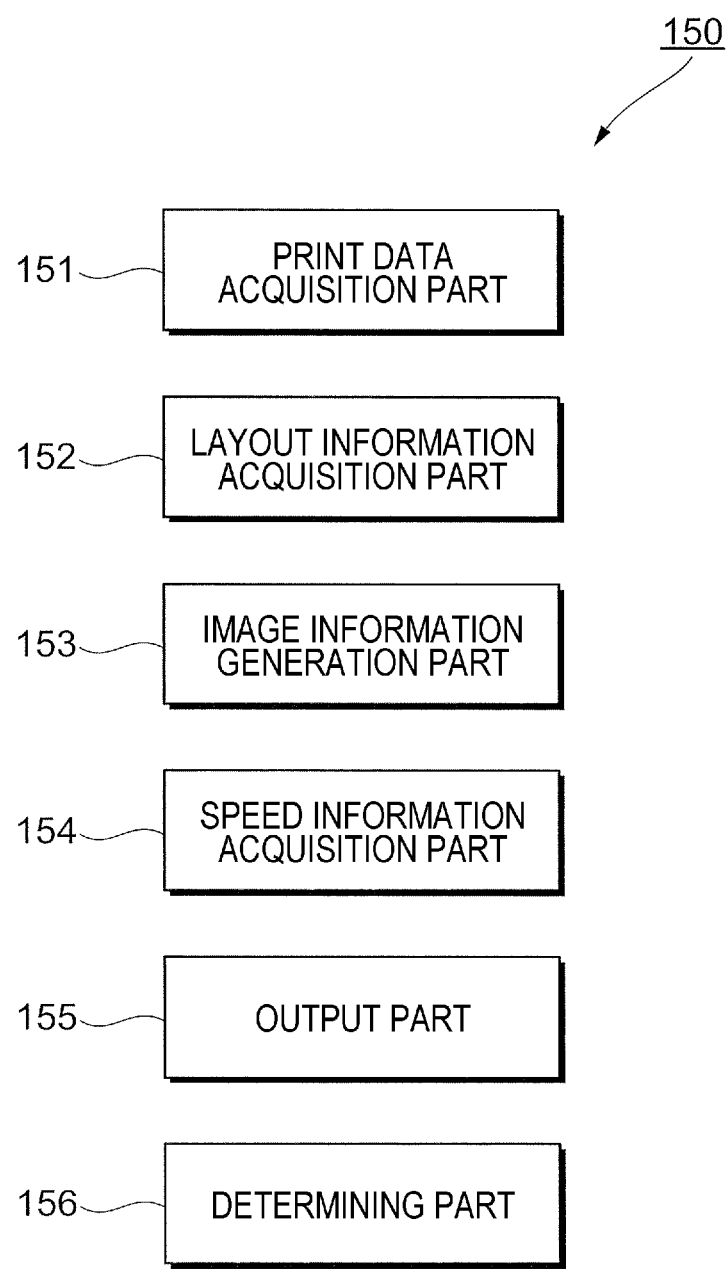
FIG. 3 illustrates functions of an information processing apparatus provided in an image reading apparatus.

FIG. 3 illustrates functions of the information processing apparatus 150 provided in the image reading apparatus 100.

In the present exemplary embodiment, the CPU provided in the information processing apparatus 150 executes a program stored, for example, in the ROM. This allows the information processing apparatus 150 to function as a print data acquisition part 151, a layout information acquisition part 152, an image information generation part 153, a speed information acquisition part 154, an output part 155, and a determining part 156, as illustrated in FIG. 3.

FIG. 3 mainly illustrates functional parts related to generation of image information.

The print data acquisition part 151 that is an example of a print data acquisition unit acquires print data obtained by the image reading part 103 (see FIG. 1) of the image reading apparatus 100.

In the present exemplary embodiment, an example in which the print data acquisition part 151 acquires print data generated by the image reading apparatus 100 is described. However, the information processing apparatus 150 may be provided in the image forming apparatus 200 or may be provided in a part other than the image reading apparatus 100 and the image forming apparatus 200. In such cases, the print data acquisition part 151 also acquires print data that is output, for example, from a PC.

The layout information acquisition part 152 that is an example of a layout information acquisition unit acquires layout information concerning the plural image forming units 210 provided in the image forming apparatus 200.

Specifically, the layout information acquisition part 152 acquires layout information concerning the image forming units 210 by receiving the layout information concerning the image forming units 210 from the image forming apparatus 200.

More specifically, the layout information acquisition part 152 acquires information indicating in which order the image forming units 210 that form images of respective colors are aligned. In other words, the layout information acquisition part 152 acquires information concerning a printing order of the plural image forming units 210.

In the present exemplary embodiment, the layout information acquisition part 152 acquires information indicating that the first image forming unit 210Y, the second image forming unit 210M, the third image forming unit 210C, and the fourth image forming unit 210K are aligned in this order from the upstream side toward the downstream side in the moving direction of the intermediate transfer belt 220. In other words, the layout information acquisition part 152 acquires information indicating that the first image forming unit 210Y for yellow, the second image forming unit 210M for magenta, the third image forming unit 210C for cyan, and the fourth image forming unit 210K for black are aligned in this order.

That is, the layout information acquisition part 152 acquires information indicating that a printing order of the image forming units 210 is yellow, magenta, cyan, and black.

The image information generation part 153 that is an example of an image information generation unit generates pieces of image information for the respective colors used by the plural image forming units 210 from the print data acquired by the print data acquisition part 151.

Specifically, the image information generation part 153 generates image information used for formation of a yellow image, image information used for formation of a magenta image, image information used for formation of a cyan image, and image information used for formation of a black image.

Furthermore, the image information generation part 153 changes an order of generation of the pieces of image information for the respective colors in accordance with the layout information acquired by the layout information acquisition part 152.

The speed information acquisition part 154 that is a speed information acquisition unit acquires information on an image formation speed.

Specifically, the speed information acquisition part 154 acquires, for each of plural image forming apparatuses 200 that can be connected to the image reading apparatus 100 (the information processing apparatus 150), an image formation speed of the image forming units 210 of the image forming apparatus 200.

More specifically, in the present exemplary embodiment, it is assumed that plural kinds of image forming apparatuses 200 are connected to the image reading apparatus 100. Therefore, a destination of print data obtained by the image reading apparatus 100 is not limited to a single image forming apparatus 200 but may be another image forming apparatus 200.

The speed information acquisition part 154 acquires, for each of the plural kinds of image forming apparatuses 200, an image formation speed of the image forming units 210 of the image forming apparatus 200 (a speed of image formation on the intermediate transfer belt 220 or the sheet of paper P).

The output part 155 that is an example of an output unit specifies an image forming apparatus 200 to which pieces of image information for the respective colors generated by the image information generation part 153 are to be supplied and then supplies the pieces of image information for the respective colors to the specified image forming apparatus 200. This allows the image forming apparatus 200 to which the pieces of image information have been supplied to form a color image.

The determining part 156 determines which of an image processing speed of the information processing apparatus 150 and an image reading speed of the image reading apparatus 100 is higher.

A program executed by the CPU of the information processing apparatus 150 can be offered to the information processing apparatus 150 while being stored in a computer-readable recording medium such as a magnetic recording medium (e.g., a magnetic tape, a magnetic disc), an optical recording medium (e.g., an optical disc), a magnetooptical recording medium, or a semiconductor memory. Alternatively, the program executed by the CPU of the information processing apparatus 150 may be downloaded to the information processing apparatus 150 by using communication means such as the Internet.

FIG. 4 is a view for explaining a flow of processing performed by the image information generation part 153.

In the image reading apparatus 100 (see FIG. 1), reading of a document starts from an edge of the document, and thus the image reading part 103 sequentially generates print data. The print data is sequentially stored in the information storage device 150A (see FIG. 2) of the information processing apparatus 150.

The image information generation part 153 generates pieces of image information for the respective colors by sequentially reading out the print data stored in the information storage device 150A by a predetermined unit of processing (by a band unit) and then performing first processing and second processing on the print data of the predetermined unit of processing.

In the first processing, the print data is subjected to filtering and color conversion. In the color conversion, print data in an RGB color space or an Lab color space into print data in a YMCK color space.

In the second processing, the print data in the YMCK color space is subjected to gamma correction and halftone processing. In other words, in the second processing, the pieces of print data for the respective colors are subjected to gamma correction and halftone processing. As a result, pieces of image information for the respective colors (yellow, magenta, cyan, and black) are generated.

FIGS. 5A and 5B are views for explaining processing performed by the image information generation part 153 and are views for explaining processing of print data corresponding to 1 page of a document.

In FIGS. 5A and 5B, the thin line with alternate long and short dashes indicates processing for yellow, the thin line with alternate long and two short dashes indicates processing for magenta, the thick line with alternate long and short dashes indicates processing for cyan, and the thick line with alternate long and two short dashes indicates processing for black.

A part indicated by the reference sign 4A in FIG. 5A indicates an amount of print data generated by reading by the image reading apparatus 100, and the generated print data increases as the time elapses.

A part indicated by the reference sign 4B indicates an amount of print data stored in the information storage device 150A, and the amount of print data stored in the information storage device 150A increases as the time elapses.

A part indicated by the reference sign 4C in FIG. 5A indicates a unit of processing in the first processing and the second processing performed by the image information generation part 153, and the image information generation part 153 generates pieces of image information for the respective colors (yellow, magenta, cyan, and black) by performing processing on the print data by this unit of processing.

In the present exemplary embodiment, first, processing is performed on print data of one unit of processing (single unit of processing) indicated by the reference sign 4E. Specifically, the image information generation part 153 generates print data in the YMCK color space (see the reference sign P1 in FIG. 5A) by performing the first processing illustrated in FIG. 4 on the print data of the one unit of processing and then sequentially generates pieces of image information for yellow, magenta, cyan, and black indicated by the reference signs Y1, M1, C1, and K1 by performing the second processing on the print data in the YMCK color space.

Next, the image information generation part 153 performs processing on second print data (print data of a second unit of processing indicated by the reference sign 4F). In other words, the image information generation part 153 starts processing on print data of another unit of processing next to the processing on the print data of the one unit of processing (the unit of processing indicated by the reference sign 4E).

Specifically, the image information generation part 153 generates print data in the YMCK color space (see the reference sign P2) by performing the first processing on the print data of the second unit of processing and then sequentially generates pieces of image information for yellow, magenta, cyan, and black indicated by the reference signs Y2, M2, C2, and K2 by performing the second processing.

Then, the image information generation part 153 sequentially performs the first processing and the second processing for each unit of processing and thereby generates pieces of image information for yellow, magenta, cyan, and black for each unit of processing.

Finally, in the present exemplary embodiment, the image information generation part 153 generates pieces of image information for yellow, magenta, cyan, and black indicated by the reference signs Y8, M8, C8, and K8 by performing the first processing and the second processing on print data of a unit of processing indicated by the reference sign 4G.

In the present exemplary embodiment, when generating pieces of image information for the respective colors, the image information generation part 153 first generates image information for yellow as indicated by the reference sign Y1 in FIG. 5A. In the present exemplary embodiment, the image information generation part 153 generates black image information last as indicated by the reference sign K8.

In other words, in the present exemplary embodiment, the image information generation part 153 first generates image information used by the first image forming unit 210Y for yellow located on a most upstream side among the plural image forming units 210 and last generates image information used by the fourth image forming unit 210K for black located on a most downstream side.

In the present exemplary embodiment, the first image forming unit 210Y for yellow is located on a most upstream side, and image formation starts first in the first image forming unit 210Y for yellow among the four image forming units 210. Therefore, in a case where image information used by the first image forming unit 210Y for yellow is generated first, image formation is started at an earlier timing.

In the present exemplary embodiment, the fourth image forming unit 210K for black is located on a most downstream side, and image formation starts last in the fourth image forming unit 210K for black among the four image forming units 210. Therefore, in the present exemplary embodiment, image information used by the fourth image forming unit 210K for black is generated last.

Furthermore, in the present exemplary embodiment, pieces of image information for the respective colors used by the first image forming unit 210Y, the second image forming unit 210M, the third image forming unit 210C, and the fourth image forming unit 210K are generated within an image information generation period from start 4X (see FIG. 5A) of generation of image information to end 4Y of generation of image information.

In the present exemplary embodiment, the start 4X of generation of image information is a timing of start of readout of print data from the information storage device 150A. The end 4Y of generation of image information is a timing of completion of generation of the image information used by the fourth image forming unit 210K located on the most downstream side.

In the present exemplary embodiment, when pieces of image information for the respective colors are generated from print data corresponding to 1 page of a document, image information used by an image forming unit 210 located on an upstream side is generated with higher priority than image information used by an image forming unit 210 located on a downstream side instead of sequentially generating the pieces of image information for the respective colors.

More specifically, in the present exemplary embodiment, when image information used by an image forming unit 210 located on an upstream side is generated, this image information is generated more in a former half of the image information generation period TL than in a latter half of the image information generation period TL. The former half of the image information generation period TL is a period from the start 4X to a time after elapse of a half of the image information generation period TL. The latter half of the image information generation period TL is a period from the time after elapse of the half of the image information generation period TL elapses to the end 4Y.

More specifically, in the present exemplary embodiment, when image information used by the first image forming unit 210Y for yellow located on an upstream side is generated, this image information for yellow is generated more in the former half of the image information generation period TL than in the latter half of the image information generation period TL.

In the present exemplary embodiment, when image information used by an image forming unit 210 located on a downstream side is generated, this image information is generated more in the latter half of the image information generation period TL than in the former half of the image information generation period TL.

Specifically, when image information used by the fourth image forming unit 210K for black located on a downstream side is generated, this image information for black is generated more in the latter half of the image information generation period TL than in the former half of the image information generation period TL.

The same applies to image information for cyan, and the image information for cyan is generated more in the latter half of the image information generation period TL than in the former half of the image information generation period TL.

Furthermore, in the present exemplary embodiment, pieces of image information for the respective colors are generated by processing print data by a predetermined unit of processing, as described above. When the pieces of image information for the respective colors are generated from print data of one unit of processing, image information for an upstream side that is image information used by an image forming unit 210 located on an upstream side is generated earlier than image information for a downstream side that is image information used by an image forming unit 210 located on a downstream side.

Specifically, in the present exemplary embodiment, image information (an example of image information for an upstream side) used by the first image forming unit 210Y for yellow is generated earlier than image information (an example of image information for a downstream side) used by the second image forming unit 210M for magenta.

Image information used by the second image forming unit 210M for magenta is generated earlier than image information used by the third image forming unit 210C for cyan. Image information used by the third image forming unit 210C for cyan is generated earlier than image information used by the fourth image forming unit 210K for black.

This is specifically described with reference to FIG. 5A. For example, when pieces of image information for the respective colors are generated from print data of a unit of processing indicated by the reference sign 4E, image information for yellow indicated by the reference sign Y1 is generated first, and image information for magenta indicated by the reference sign M1 is generated next. Then, image information for cyan indicated by the reference sign C1 is generated, and image information for black indicated by the reference sign K1 is generated last.

Furthermore, in the present exemplary embodiment, before generation of all pieces of image information (pieces of image information for all of the four colors) from print data of a unit of processing whose processing starts earlier, image information corresponding to another unit of processing whose processing starts next to the one unit of processing is generated.

This is specifically described with reference to FIG. 5A. In the present exemplary embodiment, before generation of image information for magenta (image information indicated by the reference sign M1) (an example of image information for a downstream side) that is obtained from a unit of processing indicated by the reference sign 4E whose processing starts earlier, image information for yellow (image information indicated by the reference sign Y2) (an example of image information for an upstream side) that is obtained from a unit of processing indicated by the reference sign 4F whose processing starts next to the unit of processing indicated by the reference sign 4E is generated.

Similarly, before generation of image information for cyan (image information indicated by the reference sign C1) obtained from a unit of processing indicated by the reference sign 4E whose processing starts earlier, image information for magenta (image information indicated by the reference sign M2) obtained from a unit of processing indicated by the reference sign 4F whose processing starts next to the unit of processing indicated by the reference sign 4E is generated.

Similarly, before generation of image information for black (image information indicated by the reference sign K1) obtained from a unit of processing indicated by the reference sign 4E whose processing starts earlier, image information for cyan (image information indicated by the reference sign C2) obtained from a unit of processing indicated by the reference sign 4F whose processing starts next to the unit of processing indicated by the reference sign 4E is generated.

That is, in the present exemplary embodiment, pieces of image information are generated so that before generation of image information for a downstream side obtained from print data of one unit of processing whose processing starts earlier, image information for an upstream side obtained from print data of another unit of processing whose processing starts next to the one unit of processing is generated.

That is, in the present exemplary embodiment, image information for an upstream side used by an image forming unit 210 located on an upstream side is generated with higher priority than image information for a downstream side used by an image forming unit 210 located on a downstream side.

In the present exemplary embodiment, when comparing generation timings of pieces of image information for the same color, image information obtained from one unit of processing is generated earlier than image information obtained from another unit of processing whose processing starts next to the one unit of processing.

Specifically, for example, image information for yellow (image information indicated by the reference sign Y1) that is obtained from print data of one unit of processing indicated by the reference sign 4E is generated earlier than image information for yellow (image information indicated by the reference sign Y2) that is obtained from print data of another unit of processing indicated by the reference sign 4F next to the one unit of processing.

The same applies to the other colors. For example, image information for black (indicated by the reference sign K1) that is obtained from print data of one unit of processing is generated earlier than image information for black (indicated by the reference sign K2) that is obtained from print data of another unit of processing next to the one unit of processing.

The above processing shortens a period needed from start of reading of a document to the end of printing in the present exemplary embodiment.

A line indicated by the reference sign YP in FIG. 5A represents image formation processing performed by the image forming unit 210Y for yellow, and image formation by the image forming unit 210Y for yellow starts from an image formation start point PS1. A slope of the line indicated by the reference sign YP represents an image formation speed. Lines indicated by the reference signs MP, CP, and KP represent image formation processing performed by the image forming units 210 for magenta, cyan, and black, respectively.

In the processing according to the present exemplary embodiment, the image formation start point PS1 is made closer to the left side in FIG. 5A (image formation is started at an earlier timing) than processing (described later) illustrated in FIG. 5B. Accordingly, a period needed from start of reading of a document to the end of printing becomes shorter.

Next, the processing illustrated in FIG. 5B is described.

In the processing illustrated in FIG. 5B, pieces of image information for all of the four colors are generated from print data of one unit of processing and then pieces of image information for the four colors are generated from print data of a next unit of processing. In other words, in this processing, pieces of image information for the respective colors used for image formation are sequentially generated.

Specifically, pieces of image information for the four colors indicated by the reference signs Y9, M9, C9, and K9 are generated from print data of one unit of processing (e.g., print data of a unit of processing indicated by the reference sign 4G), and then pieces of image information for the four colors indicated by the reference signs Y10, M10, C10, and K10 are generated from print data of a next unit of processing indicated by the reference sign 4H.

In this processing, a start point of image formation by the image forming units 210 is an image formation start point PS2, which is later than the image formation start point PS1 illustrated in FIG. 5A.

In this case, a period needed from start of reading of a document to the end of printing is longer than the processing illustrated in FIG. 5A.

For example, if the point indicated by the reference sign PS3 in FIG. 5B is an image formation start point (if a timing of start of image formation is made the same as the image formation start point PS1 illustrated in FIG. 5A), a situation where image information for yellow has not been generated yet when a yellow toner image is formed at a point indicated by the reference sign 4L occurs. In this case, a yellow image cannot be formed, and an image is not formed on a latter part of a printed image.

Meanwhile, in the present exemplary embodiment, when a yellow toner image is formed at the point indicated by the reference sign 4M in FIG. 5A (when a yellow toner image formed in the last part of the sheet of paper P is formed), image information for yellow has been already formed (image information indicated by the reference sign Y8 has been already formed), and therefore a yellow toner image can be formed.

FIG. 6 is a flowchart illustrating a flow of a series of processes performed by the information processing apparatus 150 according to the present exemplary embodiment.

In the information processing apparatus 150, first, the determining part 156 (see FIG. 3) acquires an image reading speed (mm/sec, ipm (images per minute), ppm (pages per minute), pixels per second) of the image reading apparatus 100 (Step 101). Next, the determining part 156 acquires an image processing speed (mm/sec, ipm (images per minute), ppm (pages per minute), pixels per second) (an image information generation speed of the image information generation part 153) of the CPU (Step 102).

Specifically, in the present exemplary embodiment, in which the processing (image processing) illustrated in FIG. 5A is performed by the CPU, a speed of this image processing performed by the CPU is acquired in Step 102.

Next, the determining part 156 determines whether or not the image processing speed of the CPU (the image information generation speed of the image information generation part 153) is higher than the image reading speed (Step 103).

In a case where it is determined in Step 103 that the image processing speed of the CPU is not higher than the image reading speed (in a case where it is determined that the image processing speed of the CPU is lower than the image reading speed), the processes in Step 104 and the subsequent steps are performed.

In Step 104, the layout information acquisition part 152 acquires layout information concerning the image forming units 210 provided in the image forming apparatus 200.

In Step 105, the image information generation part 153 determines an order of generation of pieces of image information for the respective colors on the basis of the layout information acquired in Step 104. In other words, in the present exemplary embodiment, pieces of image information for the four colors are generated for each unit of processing as illustrated in FIG. 5A, and in which order the pieces of image information for the four colors are generated is scheduled.

In the present exemplary embodiment, this scheduling process concerning image information generation is performed with reference to a reference table illustrated in FIG. 7 (a view illustrating a reference table used for scheduling).

This reference table specifies correspondences between printing orders in image formation (positions of the image forming units 210) and the numbers of units of processing corresponding to the respective printing orders, and the image information generation part 153 performs the scheduling process while referring to this reference table.

In this example, a printing order "1" indicates an image forming unit 210 located on a most upstream side, and a higher printing order indicates an image forming unit 210 located on a more downstream side. A printing order "4" indicates an image forming unit 210 located on a most downstream side.

In the present exemplary embodiment, the first image forming unit 210Y for yellow is located on a most upstream side, and a printing order of yellow is 1. In this case, the number of units of processing is 4, and therefore four units of processing for yellow are included in a single unit that will be described later.

A printing order of magenta is 2, and three units of processing for magenta are included in the single unit that will be described later. A printing order of cyan is 3, and two units of processing for cyan are included in the single unit. A printing order of black is 4, and one unit of processing for black is included in the single unit.

The reference sign 4T in FIG. 5A indicates the aforementioned single unit, and this single unit includes four units of processing for yellow, three units of processing for magenta, two units of processing for cyan, and one unit of processing for black.

In the present exemplary embodiment, the scheduling is performed so that the processing of this single unit is repeated.

The scheduling is performed, for example, when the image forming apparatus 200 is connected to the image reading apparatus 100. Once the scheduling is performed, the information processing apparatus 150 of the image reading apparatus 100 thereafter generates pieces of image information for the four colors in accordance with the schedule thus set.

The processes performed in the information processing apparatus 150 are further described with reference to FIG. 6 again.

In Step 106, the image formation start point PS1 illustrated in FIG. 5A is determined.

The image formation start point PS1 is determined by subtracting a period shorted by the processing illustrated in FIG. 5A from a predetermined default image formation start point.

More specifically, in the present exemplary embodiment, the image formation start point PS2 illustrated in FIG. 5B is set as the predetermined default image formation start point.

In the present exemplary embodiment, a period needed for generation of image information is shortened by performing the processing illustrated in FIG. 5A. In Step 106, the new image formation start point PS1 is determined by subtracting a period shortened by the processing illustrated in FIG. 5A from the image formation start point PS2 that is a default image formation start point.

In a case where printing starts from the new image formation start point PS1, a period needed from the start of reading of a document to the end of printing becomes shorter. That is, a period needed from the start of reading of a document to output of a sheet of paper P on which an image has been printed becomes shorter.

Meanwhile, in a case where it is determined in Step 103 of FIG. 6 that the image processing speed of the CPU is higher than the image reading speed, printing is started without performing the processes in Steps 104 through 106. In other words, printing is started after the image processing illustrated in FIG. 5B.

In a case where the image processing speed of the CPU is higher than the image reading speed, for example, pieces of image information for the four colors are generated by image processing at almost the same timing as generation of print data of one unit of processing in the image reading apparatus 100.

In this case, the overall processing period does not vary much irrespective of whether the processing illustrated in FIG. 5A or the processing illustrated in FIG. 5B is performed. Therefore, in the present exemplary embodiment, in a case where the image processing speed of the CPU is higher than the image reading speed, the processing illustrated in FIG. 5B is performed without performing the processes in Steps 104 through 106.

Note that the processes in Steps 104 through 106 (the processing illustrated in FIG. 5A) may be performed even in a case where the image processing speed of the CPU is higher than the image reading speed.

Figure 8:
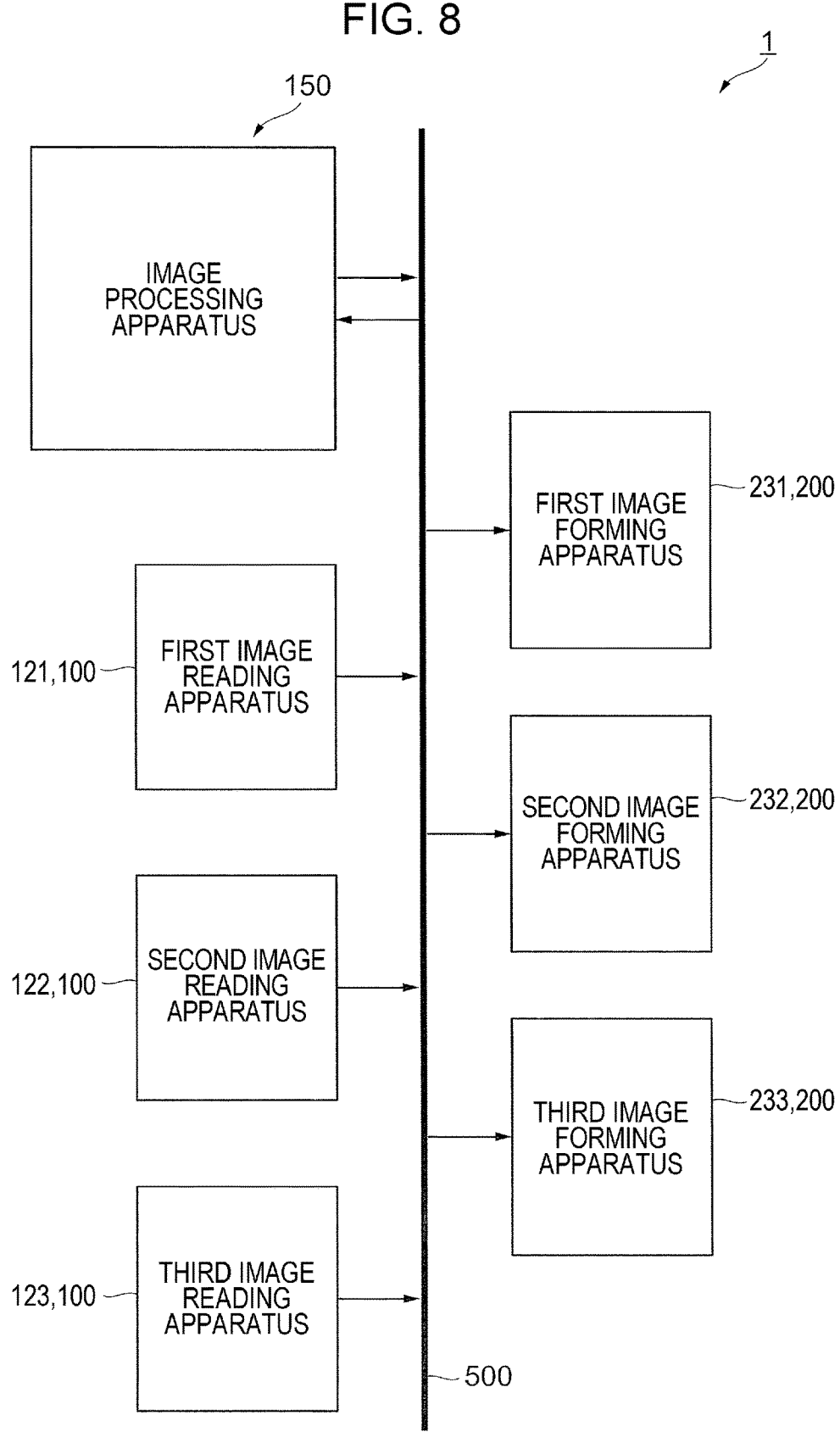
FIG. 8 illustrates another example of the configuration of the printing system.

FIG. 8 illustrates another example of the configuration of the printing system 1.

In this printing system 1, the information processing apparatus 150 is separate from the image reading apparatus 100. Plural image reading apparatuses 100 are provided. Specifically, three image reading apparatuses 100, i.e., a first image reading apparatus 121, a second image reading apparatus 122, and a third image reading apparatus 123 are provided.

Plural image forming apparatuses 200 are provided. Specifically, three image forming apparatuses 200, i.e., a first image forming apparatus 231, a second image forming apparatus 232, and a third image forming apparatus 233 are provided.

Furthermore, a communication line, such as a LAN, that connects the information processing apparatus 150, the image reading apparatuses 100, and the image forming apparatuses 200 is provided.

Figure 9:
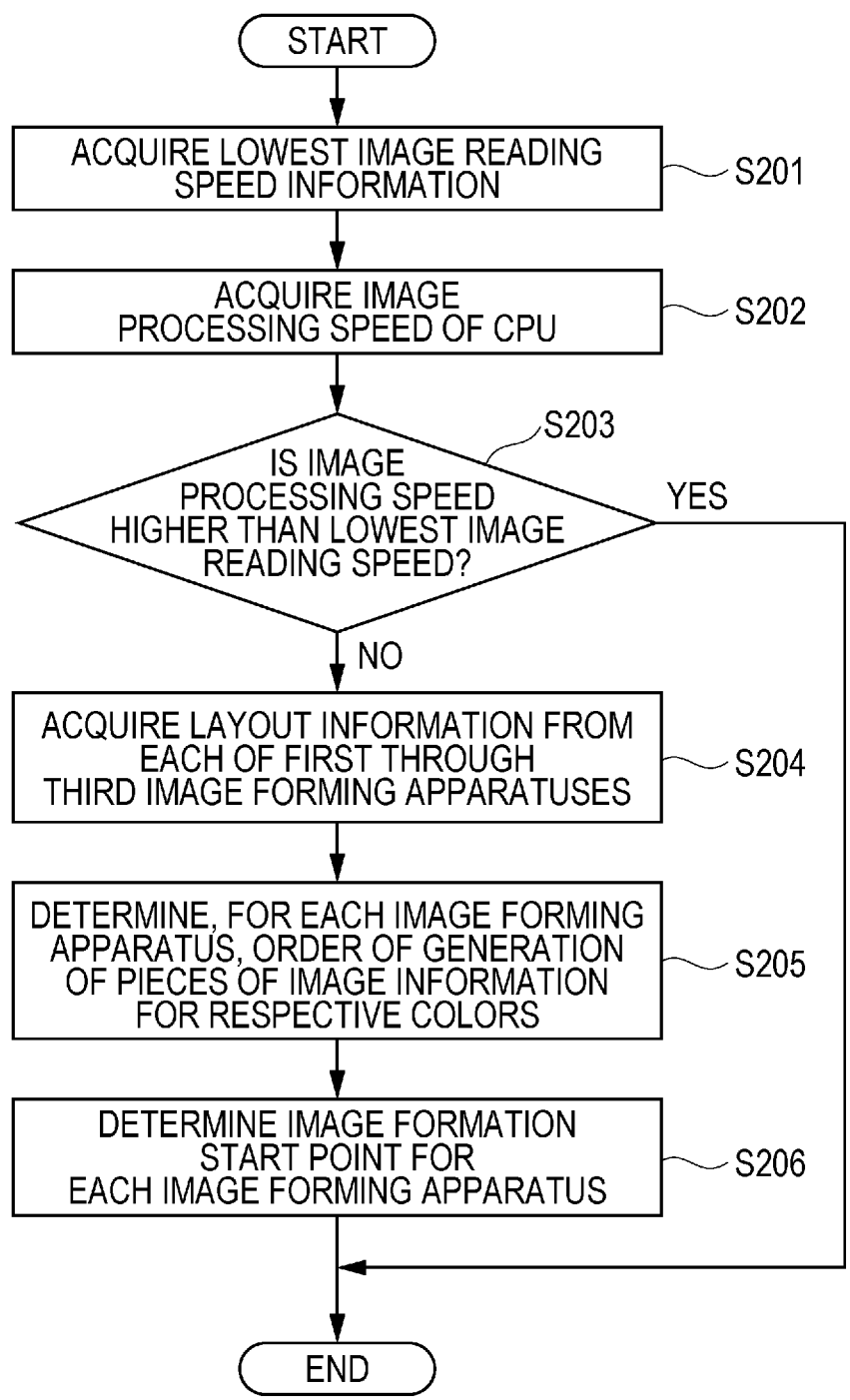
FIG. 9 is a flowchart illustrating a flow of processing performed in the printing system illustrated in FIG. 8.

FIG. 9 is a flowchart illustrating a flow of processing in the printing system 1 illustrated in FIG. 8. The processing illustrated in FIG. 9 is performed by the information processing apparatus 150.

In this processing, first, the determining part 156 (see FIG. 3) acquires information on an image reading speed (mm/sec) (hereinafter referred to as a "lowest image reading speed") of an image reading apparatus 100 having a lowest image reading speed among the first image reading apparatus 121, the second image reading apparatus 122, and the third image reading apparatus 123 (Step 201). Next, the determining part 156 acquires an image processing speed (mm/sec) of the CPU (Step 202) as in Step 102.

Next, in this processing, the determining part 156 determines whether or not the image processing speed of the CPU is higher than the lowest image reading speed (Step 203).

In a case where it is determined in Step 203 that the image processing speed of the CPU is not higher than the lowest image reading speed (in a case where it is determined that the image processing speed of the CPU is lower than the lowest image reading speed), the processes in Steps 204 through 206 are performed.

In Step 204, the layout information is acquired from each of the first image forming apparatus 231, the second image forming apparatus 232, and the third image forming apparatus 233.

In step 205, an order of generation of pieces of image information for the respective colors is determined for each image forming apparatus 200 by using the layout information acquired in Step 204 (scheduling). That is, the image information generation part 153 determines, for each image forming apparatus 200, an order of generation of pieces of image information for the respective colors on the basis of the layout information acquired in Step 204.

In other words, in the present exemplary embodiment, pieces of image information for the four colors are generated for each unit of processing as described above, and in which order the pieces of image information for the four colors are generated is determined. Furthermore, in Step 205, scheduling is performed so that the processing illustrated in FIG. 5A is performed. In other words, scheduling is performed so that image information used by an image forming unit located on an upstream side is generated with higher priority than image information used by an image forming unit located on a downstream side.

In Step 206, the image formation start point PS1 illustrated in FIG. 5A is determined for each image forming apparatus 200. In other words, the new image formation start point PS1 is determined.

More specifically, the new image formation start point PS1 is determined by subtracting a period shortened by the processing illustrated in FIG. 5A from a predetermined default image formation start point as in Step 106. Hereinafter, each of the image forming apparatuses 200 starts printing from the new image formation start point PS1.

Meanwhile, in a case where it is determined in Step 203 that the image processing speed of the CPU is higher than the lowest image reading speed, the processes in Steps 204 through 206 are not performed as in the above case.

In a case where the image processing speed of the CPU is lower than the lowest image reading speed, a period needed from the start of reading of an image to the end of printing (hereinafter sometimes referred to as a "processing period") becomes long due to the image processing speed of the CPU irrespective of which of the first image reading apparatus 121, the second image reading apparatus 122, and the third image reading apparatus 123 is used (selected).

In the processing illustrated in FIG. 9, the processes in Steps 204 through 206 are performed in a case where the image processing speed of the CPU is lower than the lowest image reading speed and the processing period becomes long.

As a result, in each of the image forming apparatuses 200, printing starts earlier, and a processing period needed from the start of reading of an image to the end of printing is shortened accordingly.

Alternatively, in the printing system 1 illustrated in FIG. 8, another kind of processing may be performed in which an image forming apparatus 200 having a highest image formation speed is specified, image information (image information generated by the information processing apparatus 150) is supplied to the image forming apparatus 200 having the highest image formation speed, and the image forming apparatus 200 having the highest image formation speed performs printing.

More specifically, in this case, first, the output part 155 of the information processing apparatus 150 specifies an image forming apparatus 200 having a highest speed on the basis of information acquired by the speed information acquisition part 154.

Then, the output part 155 supplies, to the specified image forming apparatus 200 having the highest speed, pieces of image information for the respective colors (pieces of image information for the four colors generated by the image information generation part 153 (pieces of image information for the four colors obtained by the processing illustrated in FIG. 5A)).

Alternatively, another kind of processing may be performed in which an image forming apparatus 200 having a lowest image formation speed is specified, image information is supplied to the image forming apparatus 200 having the lowest image formation speed, and the image forming apparatus 200 having the lowest image formation speed performs printing.

More specifically, in this case, first, the output part 155 of the information processing apparatus 150 specifies an image forming apparatus 200 having a lowest speed on the basis of information acquired by the speed information acquisition part 154.

Then, the output part 155 supplies, to the specified image forming apparatus 200 having the lowest speed, pieces of image information for the respective colors (pieces of image information for the four colors generated by the image information generation part 153 (pieces of image information for the four colors obtained by the processing illustrated in FIG. 5A)). As a result, image formation is performed in this image forming apparatus 200 having the lowest speed.

OTHER REMARKS

In the above description, it is assumed that plural kinds of image forming apparatuses 200 are connected to the information processing apparatus 150. However, in some cases, the image reading apparatus 100 and the image forming apparatus 200 are unified to form a single apparatus. In such cases, in this apparatus, the processing illustrated in FIG. 5A may be performed in accordance with predetermined schedule without performing the processes in Steps 101 through 106 (without dynamic scheduling).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire print data from a scanner;
select a printer from a plurality of printers connected to and operable by the information processing apparatus;
generate pieces of image information for the respective colors used by a plurality of image forming parts of the printer from the print data during a generation period;
obtain an image processing speed for printing the image at the printer selected from the plurality of printers; and
in response to the image processing speed being lower than a lowest image reading speed for acquiring the print data from the scanner, the processor:
acquires layout information for the plurality of image forming parts of the printer that are aligned from an upstream side toward a downstream side in a moving direction of a transfer target that moves and form images of respective different colors on the transfer target, and
generates image information used by an image forming part located on an upstream side in the moving direction more in a former half of the generation period than in a latter half of the generation period.

2. The information processing apparatus according to claim 1, wherein
the processor is configured to generate image information used by an image forming part located on a downstream side in the moving direction more in the latter half of the generation period than in the former half of the generation period.

3. The information processing apparatus according to claim 1, wherein
when generating the pieces of image information for the respective colors, the processor is configured to first generate image information used by an image forming part located on a most upstream side in the moving direction among the plurality of image forming parts.

4. The information processing apparatus according to claim 3, wherein
when generating the pieces of image information for the respective colors, the processor is configured to last generate image information used by an image forming part located on a most downstream side in the moving direction among the plurality of image forming parts.

5. The information processing apparatus according to claim 1, wherein
the processor is configured to generate the pieces of image information for the respective colors by processing the print data for each predetermined unit of processing; and
when generating the pieces of image information for the respective colors from print data of one unit of processing, the processor is configured to generate image information for an upstream side that is image information used by an image forming part located on an upstream side in the moving direction earlier than image information for a downstream side that is image information used by an image forming part located on a downstream side.

6. The information processing apparatus according to claim 5, wherein
the processor is configured to generate the image information for a downstream side obtained from the print data of the one unit of processing later than the image information for an upstream side obtained from print data of another unit of processing whose processing starts next to the one unit of processing.

7. The information processing apparatus according to claim 1, wherein at least one printer of the plurality of printers has a layout of image forming parts that is different than other printers of the plurality of printers connected to the information processing apparatus.

8. The information processing apparatus according to claim 1, wherein the processor is further configured to determine a start point for image formation by subtracting a period shortened by generating image information used by the image forming part located on the upstream side in the moving direction more in a former half of the generation period than in the latter half of the generation period from a predetermined default image formation start point.

9. An image forming apparatus comprising:
a processor configured to acquire print data from an information processing apparatus;
a plurality of image forming parts that are aligned from an upstream side toward a downstream side in a moving direction of a transfer target that moves and form images of respective different colors on the transfer target; and
in response to an image processing speed for printing the image at the image forming apparatus selected from a plurality of image forming apparatuses being lower than a lowest image reading speed for acquiring the print data from the scanner, the processor is configured to:
provide layout information for the plurality of image forming parts, and
receive, from the information processing apparatus, pieces of image information for the respective colors used by the plurality of image forming parts from the print data during a generation period, wherein
image information used by an image forming part located on an upstream side in the moving direction is received from the information processing apparatus in a former half of the generation period.

10. A non-transitory computer readable medium storing a program causing a computer to execute a process, the process comprising:
acquiring print data from a scanner;
selecting a printer from a plurality of printers connected to and operable by an information processing apparatus;
generating pieces of image information for the respective colors used by a plurality of image forming parts of the printer from the print data during a generation period;
obtaining an image processing speed for printing the image at the printer selected from the plurality of printers; and
in response to the image processing speed being lower than a lowest image reading speed for acquiring the print data from the scanner:
acquiring layout information for the plurality of image forming parts of the printer that are aligned from an upstream side toward a downstream side in a moving direction of a transfer target that moves and form images of respective different colors on the transfer target, and generating image information used by an image forming part located on an upstream side in the moving direction more in a former half of the generation period than in a latter half of the generation period.

* * * * *